United States Patent Office 2,869,211
Patented Jan. 20, 1959

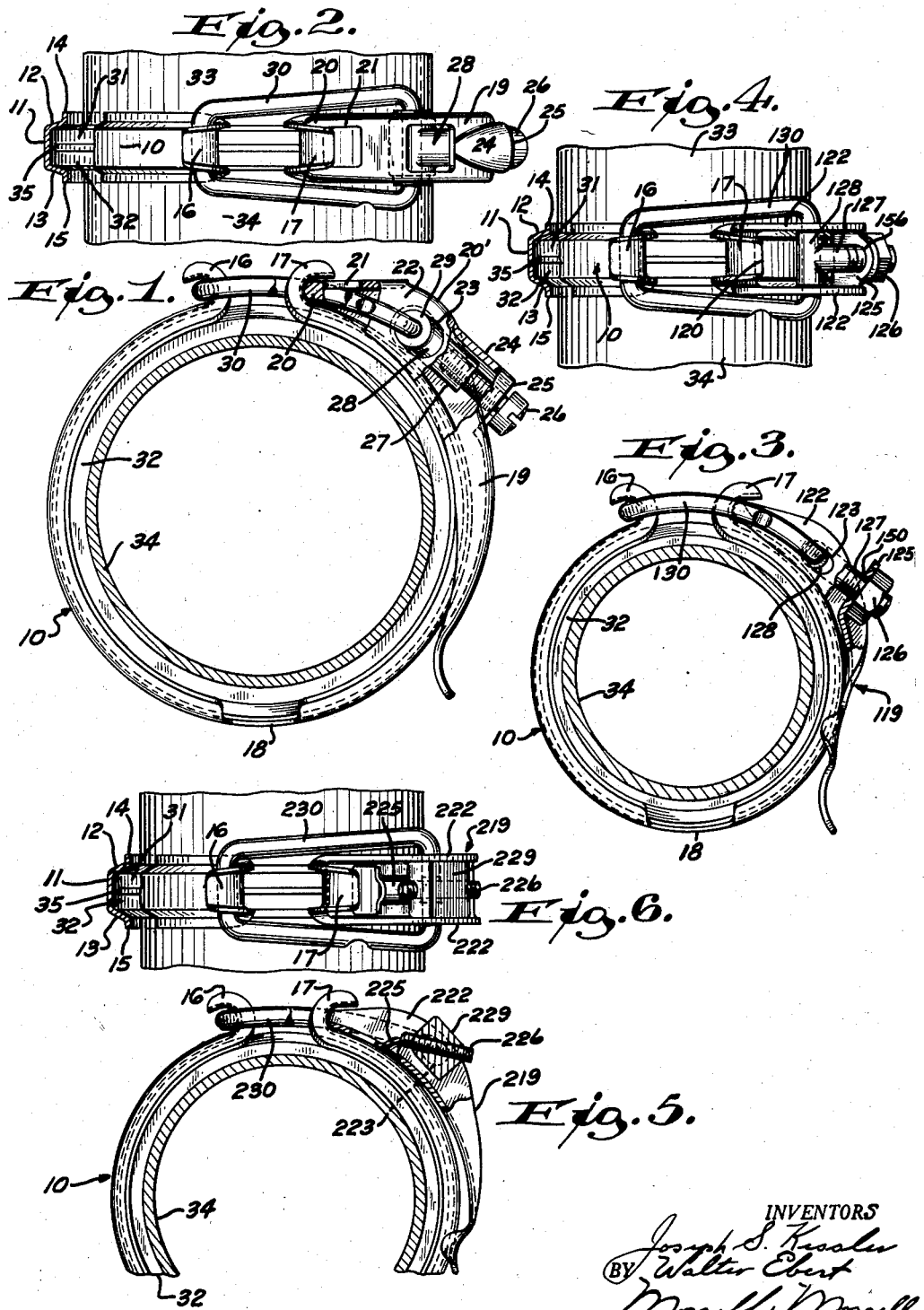

2,869,211

ADJUSTABLE TOGGLE-TYPE CONNECTING ASSEMBLIES

Joseph S. Kessler and Walter Ebert, Kenosha, Wis., assignors to Ladish Co., Cudahy, Wis., a corporation of Wisconsin Application October 15, 1956, Serial No. 616,020

2 Claims. (Cl. 24—270)

This invention relates to improvements in adjustable toggle type connecting assemblies, and more particularly to connecting assemblies for drawing and holding together the ends of a clamping band.

In industries, such as the food industry, wherein it is of utmost importance that sanitary conditions at all times prevail, the equipment used therein must be frequently disassembled and cleaned. To this end the equipment must be designed with a minimum of parts, said parts being associated in easily disassembled relationship and being devoid, as much as possible, of screw threading, corners, or other crevices where food particles may lodge.

Because it is particularly well adapted for sanitary applications, the V-type clamping band, used in connection with flanged coupling members, has replaced bolted type connections at many points in food handling equipment.

In my Patent No. 2,649,632, dated August 28, 1953, a toggle type connecting assembly is disclosed wherein there is a toggle handle with a nose which pivots against a seat on one end of the clamping band and wherein a bail is pivotally connected to the toggle handle inwardly of the nose and is adapted to be engaged with a lug on the other end of the clamping band to draw the clamping band ends together when the handle is pressed inwardly toward the band. This type of construction is very satisfactory for many uses. It has been found, however, that when a gasket at a joint begins to wear or lose its original toughness or elasticity that leakage at the joint begins to occur. With the construction of my prior patent it has been necessary to replace the gasket when this occurred. Certain gaskets, such as those made with "Teflon" are quite expensive and it is therefore desirable to increase the life of these gaskets.

In addition, with the construction of my prior patent, manufacture of the clamping band and toggle assembly must be quite perfect in order to produce just the right amount of clamping action, and the larger the fitting on which the clamping bands are used, the more care that is required in manufacture and the more likely it is for leakage to occur when gaskets have been used for a substantial period.

It is a general object of the present invention to provide a toggle type connecting assembly of the class above described having novel means for varying the effective length of the connecting bail, which means may be adjusted either before or after the clamping lever has been snapped shut. With this arrangement, after a gasket begins to wear or lose its original toughness or elasticity the bail may be drawn inwardly slightly by the novel adjustment so that when the clamp is closed the ends of the clamping band will be drawn closer together to take up the wear. The adjustment may also be made at the time of first use in order to compensate for any manufacturing imperfections. In this way manufacture can be much less exact as to tolerances.

A further object of the invention is to provide a device as above described and including novel means for varying the effective length of the bail whereby release of the clamp can be accomplished more easily.

A more specific object of the invention is to provide an adjustable toggle type connecting assembly wherein there is a movably mounted bearing for pivotally connecting one end of the bail to the clamping lever and wherein there is screw means for varying the distance of said bearing from the adjacent end of the clamping lever.

Other objects of the invention are to provide an adjustable toggle type connecting assembly which is relatively simple in construction, neat in appearance, easy to operate, and otherwise well adapted for the purpose described.

With the above and other objects in view, the invention consists of the improved adjustable toggle type connecting assembly, and all of its parts and combinations, as set forth in the claims, and all equivalents thereof.

In the accompanying drawing, illustrating several embodiments of the preferred form of the invention, in which the same reference numerals indicate the same parts in all of the views:

Fig. 1 is a cross-sectional view through a pipe adjacent a joint showing the improved toggle type connecting assembly thereon, parts of the assembly being broken away and shown in section;

Fig. 2 is a top view of the structure of Fig. 1, the ends of the coupled pipes being broken away and part of the clamping band being broken away and shown in section;

Fig. 3 is a view similar to Fig. 1 showing a modification;

Fig. 4 is a top view of the structure of Fig. 3, part of the clamping band being broken away and shown in section;

Fig. 5 is a view similar to Fig. 1 showing another modification, the lower portion being broken away; and Fig. 6 is a top view of the structure of Fig. 5, part of the clamping band being broken away and shown in section.

Referring more particularly to the drawings, the numeral 10 designates a V-type clamping band which is preferably circular in outline. The band is formed with a cylindrical peripheral wall portion 11 having divergent inwardly extending annular wall portions 12 and 13, said last wall portions at their inner edges having outwardly projecting annular flanges 14 and 15. The band has juxtaposed opposite end portions with return bends to form hooks 16 and 17. Diametrically opposite the hooks 16 and 17 portions of the walls 12 and 13 and flanges 14 and 15 are cut away as at 18 to leave an extent of the peripheral wall 10 which is flexible.

A locking handle or toggle lever 19 of irregular conformation is channel-shaped in cross-section for the major portion of its length and has a width greater than the width of the hook 17. The handle is formed at one end with a rounded nose portion 20 which is adapted to be pivotally seated in the hook 17. In a portion of its web of the handle which is adjacent the nose is an aperture 21, said aperture being so positioned and of such size as to receive the end of the hook 17 when the handle 19 is swung outwardly above its nose from the position of Fig. 1.

Inwardly from the nose portion 20 the handle is humped as at 20' and is formed in its opposite side flanges 22 with alined elongated apertures 23. Projecting outwardly from the back of the handle and away from the nose is an elongated hollow offset 24 having an apertured closed end 25 forming an adjustment lug. An adjustment screw 26 having an external slotted head is slidable through the aperture in the end or lug 25 and has its inner end in threaded engagement with the stem 27 of a T-shaped pivot bearing member 28, the latter having a transverse portion 29 with ends movable in the slots 23 so that the bearing member is movable toward and away from the nose 20 in the slots 23 as permitted by the adjustment of the screw 26.

Pivoted in the bearing member 29 is one end of a bail 30. The other end of the bail is detachably engageable with the hook 16 at the other end of the clamping band.

In the modification of Figs. 3 and 4 the clamping band is the same in construction. The lever 119, however, has outwardly projecting spaced flanges which are provided with elongated apertures 123 for receiving one transverse end of the bail 130, which end is pivotally connected to a T-shaped bearing member 128 having a stem 127 which has its outer portion threaded and slidable through a hole 150 in an upstanding adjustment lug 125. A nut 126 which is threaded on the end of the stem 127 may be manipulated to draw the bearing portion 128 toward the lug or it may be loosened to permit movement of the bearing closer to the nose 120 of the lever 119.

In the modification shown in Figs. 5 and 6 the clamping band is the same as that of Figs. 1 and 3, and the lever 219 has upstanding side walls 222 provided with elongated slots 223 which are like the slots 123 of the form of the invention of Fig. 3, and 23 of the form of the invention of Fig. 1. The bent ends of the bail 230 which make up one of its transverse parts extend through the slots 223 and are pivoted in the sides of a bearing block 229. Threaded diagonally through this block is a screw 226 having its inner end engageable with a lug 225 on the lever.

In all forms of the invention the same reference numerals will be applied to the pipe portions which are to be connected, and the same reference numerals will be applied to the various parts of the clamping bands.

*Operation*

In use, one of the clamping bands 10 is assembled around the flanges 31 and 32 of pipes 33 and 34 which are to be connected, there being a gasket 35 between the flanges as shown in Figs. 2, 4 and 6. With the clamping levers 19, 119 or 219 swung out away from the bands the outer ends of the bails 30, 130 or 230 are engaged with the hooks 16. Then by snapping the clamping members 19, 119 or 219 to the clamping position of Figs. 1, 3 and 5, the ends of the clamping band 10 are drawn together causing the diverging sides 12 and 13 of the clamping band to act on the tapered outer sides 31 and 32 of the pipe flanges to draw the faces of the flanges toward one another to compress the gasket 34 and make a firm joint. If the degree of clamping pressure which is desired is not obtained, the tightness may be increased by tightening the bolt 26, nut 126, or screw 226. This may be done either before or after the clamping handle 19, 119 or 219 has been closed. If there is too great a clamping pressure, the bolt 26, nut 126 or screw 226 may be loosened. In all cases these adjustments vary the effective length of the bail 30, 130 or 230, that is, they vary the distance which the bail projects beyond the hook 17 when the clamp is closed.

When it is desired to release the clamp it may at times be difficult, particularly in large sizes, to manipulate the lever. This release may be rendered very simple by first loosening the bolt 26, nut 126 or screw 226. For average size clamps, once a proper adjustment is obtained it is not necessary to change this adjustment until leakage occurs at the joint. When this happens then the bolt 26, nut 126 or screw 226 may be tightened to provide a take-up for wear or for loss of newness in the gasket.

It is apparent that these clamping assemblies may be manufactured with a minimum of care as to tolerances, because any variances may be compensated for by the adjustment members.

Various changes and modifications may be made without departing from the spirit of the invention, and all of such changes are contemplated as may come within the scope of the claims.

What we claim is:

1. A toggle type connecting assembly for a clamping band having a pair of relatively movable juxtaposed end portions to be drawn and held together, comprising a hook on one of said end portions projecting away from its end portion, a bail having spaced side portions, a clamping handle having spaced side flanges within said side portions of the bail, said flanges having alined elongated openings and said handle having one end formed with a nose pivotally engaged with the other of said end portions of the band, a tubular bearing member extending transversely between said handle flanges and having a central stem positioned between the flanges and projecting in the general direction of the longitudinal axis of the handle, the spaced side portions of the bail having inwardly bent trunnions at one end extending from the outside through said alined apertures of the handle flanges and pivotally engaged in the ends of said transverse bearing member, said bail having a closed end engageable with said hook, a lug on said handle, and a screw projecting from the central stem of said bearing member and engaged with said lug for adjusting the bearing member toward and away from the nose portion of the handle to vary the effective length of the bail.

2. A toggle type connecting assembly for a clamping band having a pair of relatively movable juxtaposed end portions to be drawn and held together comprising a hook on one of said end portions projecting away from its end portion, a bail having spaced side portions, a clamping handle having spaced side flanges within said spaced side portions of the bail and having a lug between said spaced side flanges, said flanges having alined elongated apertures and said handle having one end formed with a nose pivotally engaged with the other of said end portions of the band, a bearing member slidable between said flanges of the handle, said spaced side portions of the bail having inwardly bent trunnions at one end extending from the outside through said alined apertures and pivotally engaged in opposite sides of said bearing member, and said bail having a closed end engageable with said hook, said lug on the handle being located between said bearing member and said handle nose, and a screw in said bearing member and having a projecting end engaged with said lug for adjusting the bearing member toward and away from the nose portion of the handle to vary the effective length of the bail.

References Cited in the file of this patent
UNITED STATES PATENTS

| | | |
|---|---|---|
| 1,898,742 | Phillips | Feb. 21, 1933 |
| 2,649,632 | Kessler | Aug. 25, 1953 |
| 2,775,806 | Love | Jan. 1, 1957 |